Patented Dec. 10, 1946

2,412,305

UNITED STATES PATENT OFFICE 2,412,305

FOOD PRODUCT

William Ernest Stokes, Garden City, and Margaret H. Kennedy, Bronx, N. Y., assignors to Standard Brands Incorporated, New York, N. Y., a corporation of Delaware No Drawing. Application July 20, 1943, Serial No. 495,496

8 Claims. (Cl. 99—130)

The invention relates to a food product and a procedure for its preparation. More particularly, it pertains to an edible gelatin food product, and includes correlated improvements and discoveries whereby the qualities thereof are enhanced.

An object of the invention is to provide an edible gelatin product characterized by improved keeping qualities and facility of utilization.

A further object of the invention is to provide a gelatin food product that may be produced readily and economically in commercial amounts.

An additional object of the invention is the provision of a gelatin food product containing fumaric acid as an acid ingredient.

A specific object of the invention is to provide a gelatin dessert and a procedure for its preparation which contains as ingredients gelatin, a sweetening agent, fumaric acid and a small amount of flavor.

Other objects of the invention will in part be obvious and will in part appear hereinafter.

The invention accordingly comprises the several steps and the relation of one or more of such steps with respect to each of the others, and the product possessing the features, properties, and the relation of constituents, which are exemplified in the following detailed disclosure, and the scope of which invention will be indicated in the claims.

In the practice of the invention an edible gel, as a gelatin product, may be prepared by combining gelatin, a sweetening agent and fumaric acid as an acid constituent. Additionally, a small amount of a flavor, natural or synthetic, or a compatible admixture thereof, may be included especially when the product constitutes a gelatin dessert. The gelatin employed may be any edible type, and preferably in a granular form. As a sweetening agent there may be included sugar (sucrose), crystallized dextrose, saccharine and the like. While fumaric acid may constitute the sole acid constituent, nevertheless other acid substances may also be combined, as various fruit acids, e. g., tartaric, citric and malic acids. In order to provide a relatively quick-setting gelatin dessert the composition may include salts of organic acids, as acetates, lactates, tartrates and citrates, preferably in the form of alkali metal salts, and specifically sodium hydrogen tartrate. These salts act as buffer salts and repress the ionization of the acid. The quantity thereof consequently should be sufficient to repress the ionization of the acid which leads to a decrease in the time required for setting of a water solution of a composition. Further, this is effected without deleterious influence upon the palatability of the product. A satisfactory gelatin product, and one suitable as a dessert, may contain 8 to 12 parts of gelatin, 80 to 95 parts sugar, 0.75 to 2 parts acid substance, as fumaric acid or an admixture of fumaric and tartaric acids, and a small amount of flavor.

As an illustrative embodiment of a manner in which the invention may be practiced, the following examples are presented. The parts are by weight.

Example I

| | Parts |
|---|---|
| Sugar | 88.5 |
| Gelatin | 10.1 |
| Tartaric acid | .9 |
| Fumaric acid | .5 |

Flavor and color in small amounts.

Preparation of the product may be effected by combining the flavor with a small amount of the sugar and a small amount of the gelatin, and the color may be combined with a portion of the sugar. Flavored gelatin and colored sugar are then combined with the remainder of the sugar and gelatin and with the tartaric and fumaric acids. If desired, the acid ingredient may be composed entirely of fumaric acid whereupon the amount thereof to be combined would be about one part inasmuch as an effective amount of fumaric acid in comparison with tartaric acid is about 57%.

Example II

| | Parts |
|---|---|
| Sugar | 80 |
| Granulated gelatin | 10 |
| Fumaric acid | .95 |

The foregoing amounts may be combined in a suitable manner and, upon solution in water and setting to a gel, the product has a sweet astringent taste and a pH value of about 3. Moreover, if desired, the product may be prepared with a small amount of flavor and an edible color.

Example III

| | Parts |
|---|---|
| Sugar | 82 |
| Gelatin | 10 |
| Crystallized dextrose | 5 |
| Fumaric acid | 1.3 |

The foregoing may be combined to form a gelatin dessert composition, and there may also be included a small amount of flavor and of an edible color. As above indicated, the flavor may be either a natural or a synthetic one, and usual flavors are lemon, lime, orange, strawberry, raspberry, cherry and pineapple.

Gelatin products conforming to the above presented compositions are well adapted for the preparation of gelatin desserts by dissolving in water, preferably warm, and permitting the solution to cool, with setting to a gel. Desserts so produced have an agreeable taste and flavor and, in addition, they are tender, permanent, tart, clear and brilliant in color and firm in texture. Moreover, the inclusion of fumaric acid leads to a distinct dimunition in the quantity of acid, namely, tartaric acid, usually employed. Thus, it is found that fumaric acid may be introduced in an amount which is 57% of the weight of the tartaric acid. Additionally, the gelatin compositions containing fumaric acid are markedly non-caking.

Furthermore, fumaric acid gives to the product a greater tartness or stronger acid taste, and inasmuch as the pH value of the solution is somewhat higher, namely, about pH 3.0 and higher, there is a saving in the amount of gelatin required to give a gel of a certain value of set. This saving has been found to be about 2%. Fumaric acid also imparts to the product a distinctive water repellent property and when in the crystalline form it is not readily wet by water. These properties permit of the inclusion of a relatively small amount of fumaric acid and a low hydrolyzing action which results in a gelatin product, as a dessert powder, having improved keeping qualities. This is illustrated by the following tabulation of results obtained in a comparative test between dessert powders prepared with tartaric acid and with fumaric acid. The compositions were the same, excepting that the acid ingredient in the one was tartaric acid and in the other fumaric acid.

*Percent swelling*

| Duration | Tartaric | Fumaric |
|---|---|---|
| 6 weeks | 0 | 0 |
| 8 weeks | 9 | 1 |
| 28 weeks | 50 | 12 |

Hence, compositions containing fumaric acid as an acid ingredient have distinctly improved keeping qualities.

It may be added that inversion of the sugar is low and action upon gelatin slight in view of the fact that the solubility in water and rate of solution therein of fumaric acid is relatively low.

Gelatin desserts are frequently prepared in the form of a dry powder. They, however, are sometimes produced by dissolving the dessert composition in a small quantity of water or other suitable liquid, and permitting the solution thus obtained to set. Thus, there may be produced a firm gel which may be cut into cubes or other desirable form of suitable size and marketed as such. When utilization is made of this form, it is necessary only to dissolve the desired amount in water and permit such solution to set. It will be realized that the invention described herein relates not only to the dry form of gelatin composition but also to that which is a firm gel.

Since certain changes in carrying out the above process, and certain modifications in the composition which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A gelatin product containing fumaric acid as an acid ingredient.
2. A gelatin product containing fumaric acid as the acid ingredient.
3. A gelatin product comprising gelatin, a sweetening agent and fumaric acid.
4. A gelatin product comprising gelatin, sugar and fumaric acid.
5. A gelatin product comprising gelatin, sugar, fumaric acid and a flavor.
6. A gelatin product comprising gelatin, sugar, fumaric acid and a buffer salt.
7. A gelatin product comprising gelatin, sugar, fumaric acid, sodium bitartrate and flavor.
8. A gelatin product consisting essentially of an edible gelatin containing fumaric acid as an acid constituent.

WILLIAM ERNEST STOKES.
MARGARET H. KENNEDY.